US012810587B2

(12) United States Patent
Leizerovitch et al.

(10) Patent No.: US 12,810,587 B2
(45) Date of Patent: Nov. 24, 2026

(54) SEMI-SUPERVISED TRAINING FOR EMBEDDING CLASSIFICATIONS

(71) Applicant: AUTOBRAINS TECHNOLOGIES LTD, Tel Aviv-Jaffa (IL)

(72) Inventors: Shay Leizerovitch, Mikhmoret (IL); Tomer Cohen, Tel Aviv-Jaffa (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 219 days.

(21) Appl. No.: 18/746,172

(22) Filed: Jun. 18, 2024

(65) Prior Publication Data

US 2025/0384602 A1 Dec. 18, 2025

(51) Int. Cl.

*G06T 11/60* (2026.01)
*G06V 10/44* (2022.01)
*G06V 10/764* (2022.01)
*G06V 10/82* (2022.01)

(52) U.S. Cl.

CPC ............ *G06V 10/764* (2022.01); *G06T 11/60* (2013.01); *G06V 10/44* (2022.01); *G06V 10/82* (2022.01)

(58) Field of Classification Search

CPC ........ G06T 11/60; G06V 10/82; G06V 10/44; G06V 10/764

See application file for complete search history.

(56) References Cited

U.S. PATENT DOCUMENTS 11,232,328 B2 * 1/2022 Mounsaveng ....... G06N 3/0464
11,960,570 B2 * 4/2024 Xiao .................... G06V 10/772
12,518,513 B2 * 1/2026 Ma ............................ G06T 7/33

* cited by examiner

*Primary Examiner* — Gregory M Desire
(74) *Attorney, Agent, or Firm* — RECHES PATENTS

(57) ABSTRACT

A neural network training method for autonomous driving, the method includes (i) obtaining, by a computer device, features generated by a neural network and representing a first augmented image and at least a second augmented image, where the first augmented image and at least the second augmented image are different augmented image versions of a training image; (ii) determining, by the computer device, one or more an angular related losses based on the first augmented image and the second augmented image; (iii) determining a contrastive learning loss based on the first augmented image and the second augmented image; and (iv) updating the neural network based on the one or more angular related loss and on the contrastive learning loss.

20 Claims, 10 Drawing Sheets

200

SEMI-SUPERVISED TRAINING FOR EMBEDDING CLASSIFICATIONS

BACKGROUND

Neural networks are employed in vehicles for various purposes including the classification of items sensed by sensors related to the vehicle.

Neural networks, even when extensively trained, may output erroneous classification decisions.

There is an on-going need to improve the accuracy of the classification.

SUMMARY

A method, system and non-transitory computer readable medium as illustrated in the application.

A BRIEF DESCRIPTION OF THE DRAWINGS

The embodiments of the disclosure will be understood and appreciated more fully from the following detailed description, taken in conjunction with the drawings in which.

Figure 7:
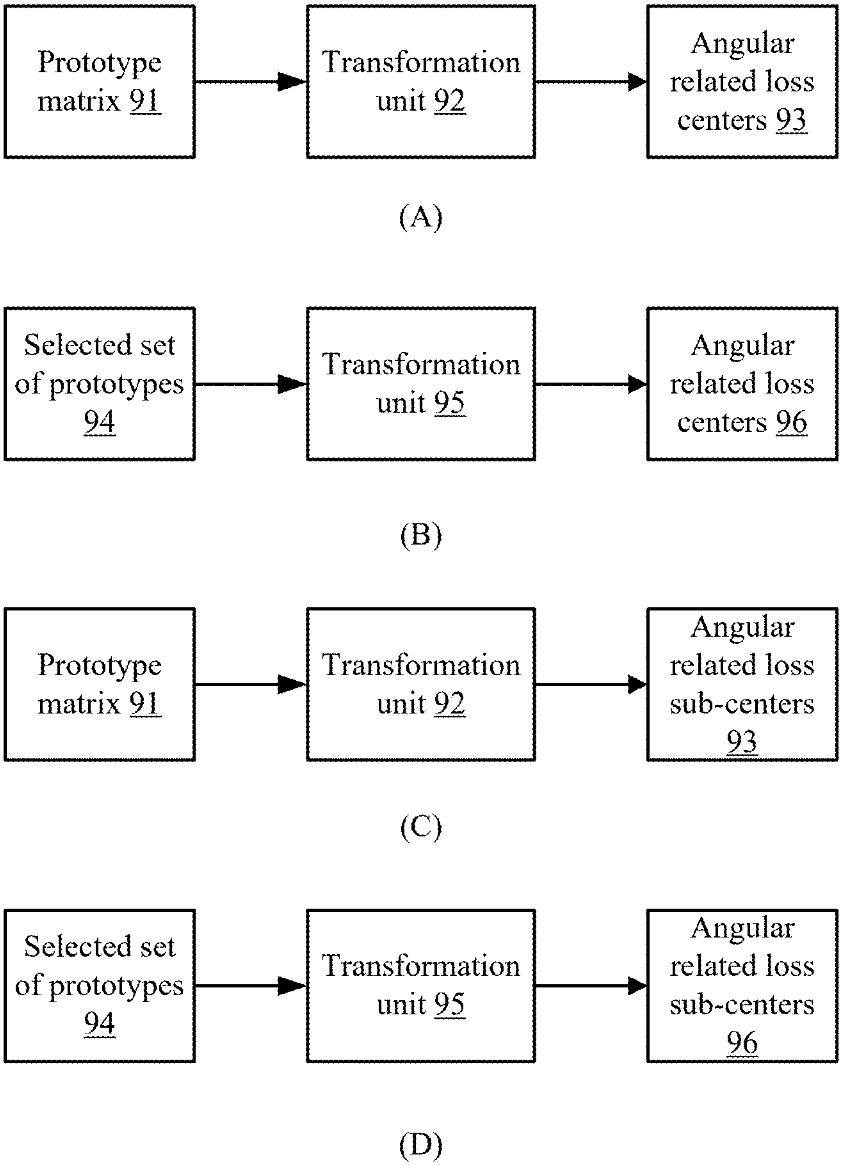
Figure 8:
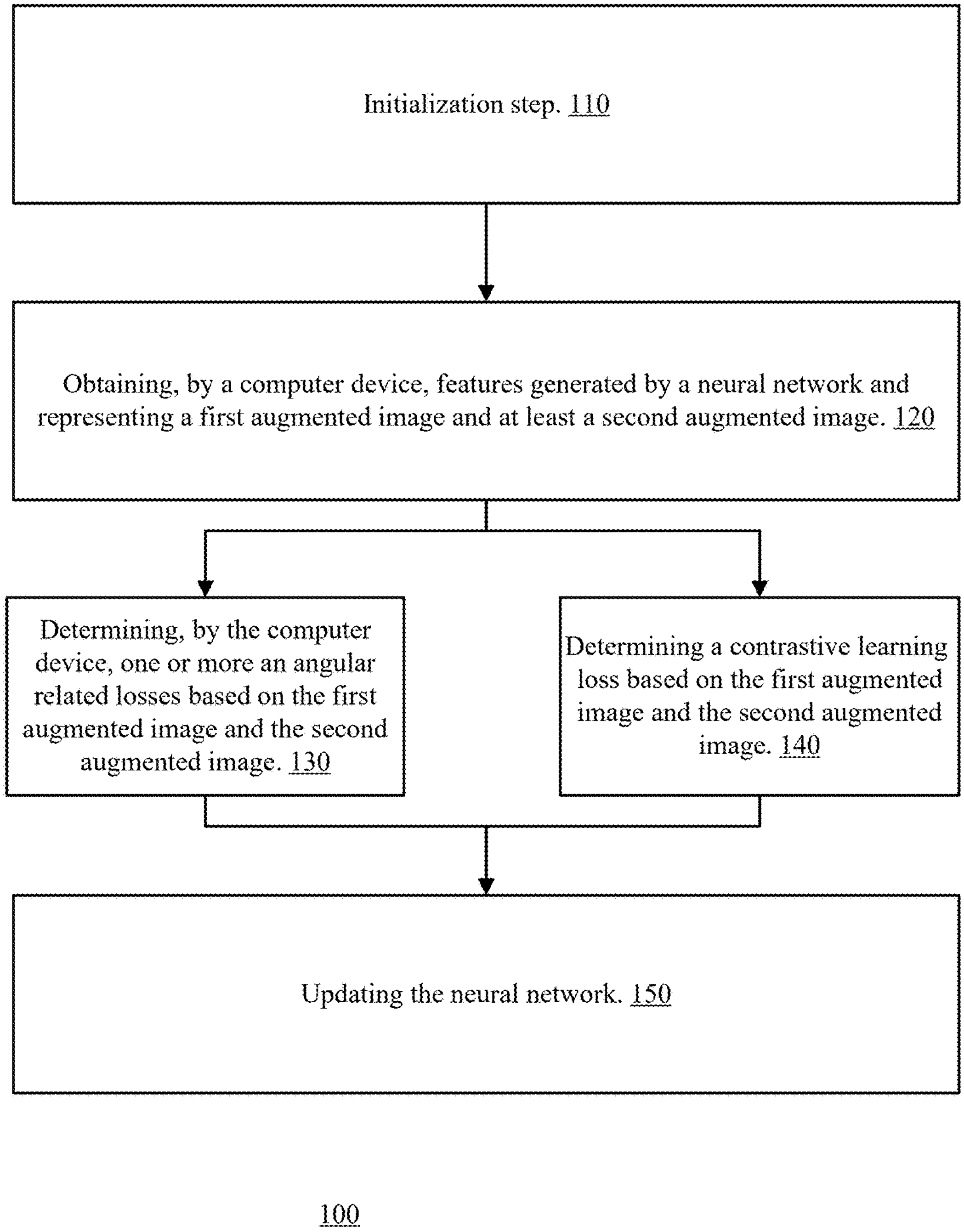
Figure 9:
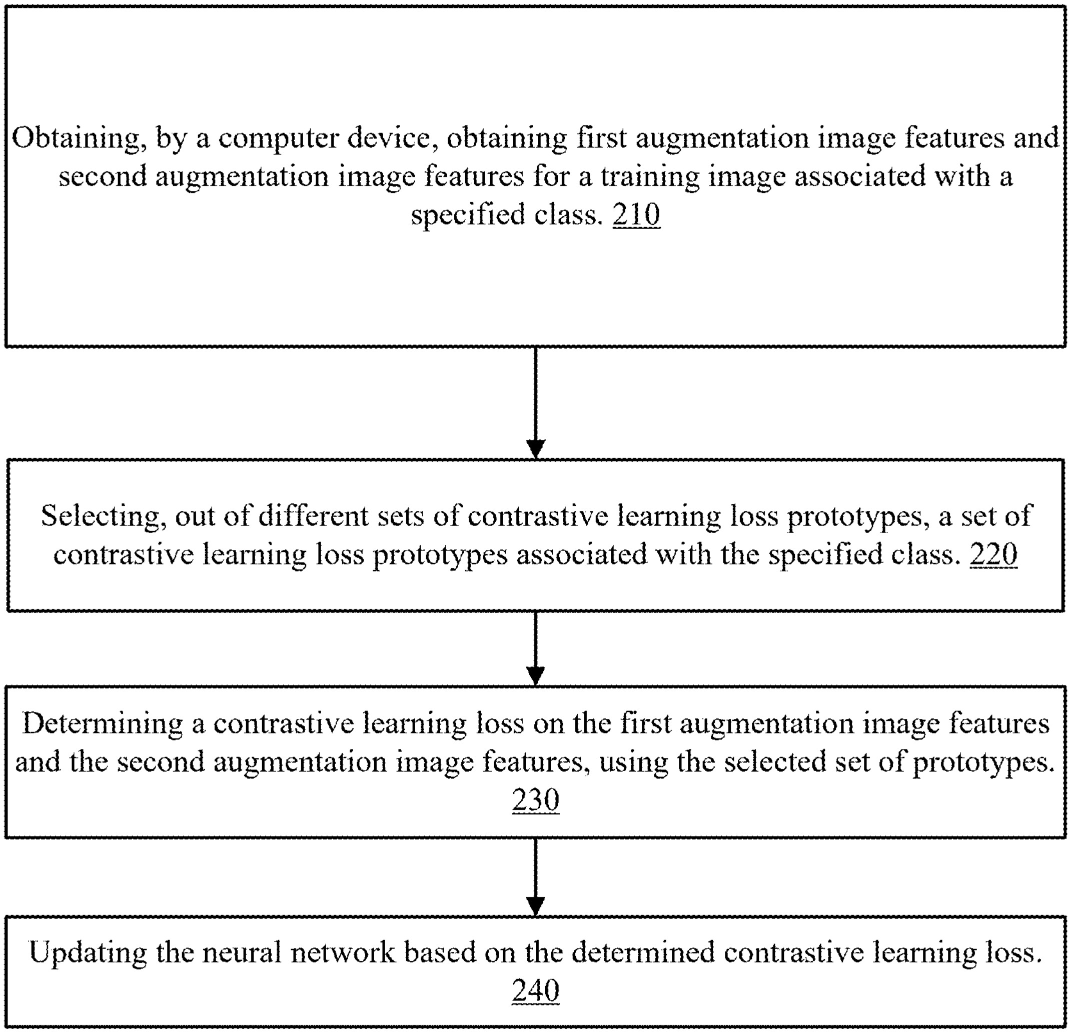

FIG. 7 provides examples of a transformation of either a prototype matrix or a selected set of prototypes by a transformation unit to provide one or more angular related loss centers or angular related loss sub-centers;

FIG. 8 illustrates an example of a method;

FIG. 9 illustrates an example of a method; and

Figure 10:
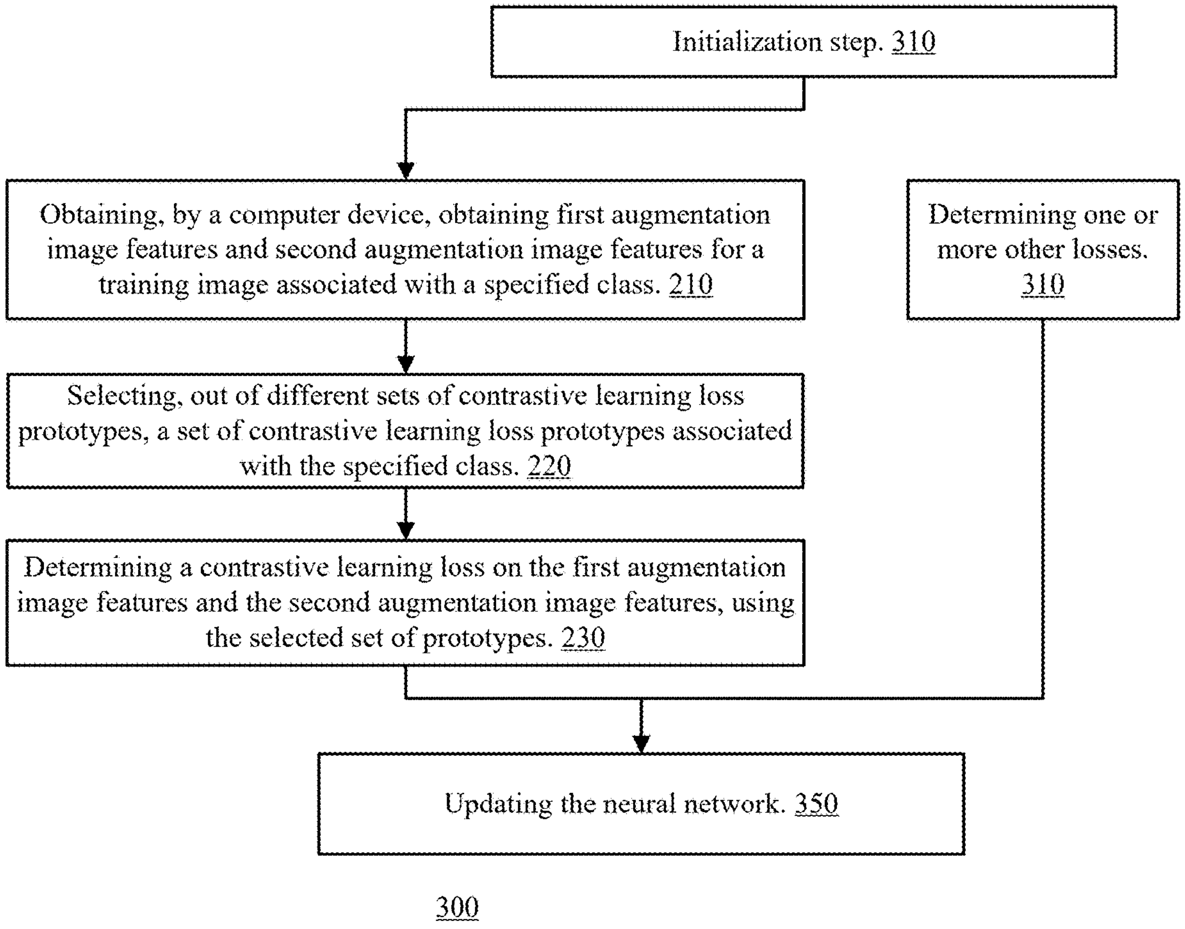

FIG. 10 illustrates an example of a method.

DETAILED DESCRIPTION

The different figures illustrates examples of units and/or software and/or information items and/or steps and/or components. These examples are provided for brevity of explanation. At least one of the units and/or software and/or information items and/or steps and/or components is optional or mandatory.

Sensed information is information that may be sensed by a sensor. The sensor may be an active sensor, a passive sensor, an image sensor, an infrared sensor, a near-infrared sensor, a radar, a sonar, an ultrasonic sensor, an x-ray sensor, a color sensor, a mechanical sensor, and the like.

A sensed information unit (SIU) may be a packet, an image, a set of images, a video, an audio-visual stream, or any other segment or portion or sensed information—for example sensed information being sensed at a given period of time.

According to an embodiment, there is provided a training process that trains a neural network by (i) calculating losses of different types in relations to different augmentations of the same sensed information unit, and (ii) amending the neural network according to the losses.

According to an embodiment, once trained by the losses of the different types, the trained neural network will generate representations of SIUs of the same sub-class closer to each other will separate representations of SIUs of different sub-classes from each other.

According to an embodiment, once trained by the losses of the different types, the trained neural network will provide better classification in the class domain and also provide a better classification in the sub-class domain.

Examples of classes include pedestrians, four wheel vehicles, two wheel vehicles, scenes.

Examples of sub-classes include pedestrians of different age, pedestrians of different genders, pedestrians of different ethnicity, pedestrians wearing different cloths and/or hats, four wheel vehicles of different manufacturers, four wheel vehicles of different models, four wheel vehicles of different colors, two wheel vehicles of different manufacturers, two wheel vehicles of different models, two wheel vehicles of different colors, and the like.

What amounts to a class or to a sub-class may be determined by supervised learning and/or by any entity (vendor, manufacturer, administrator, user, technician, and the like).

According to an embodiment, one type of loss is a contrastive learning loss that represents a swapped prediction loss.

A. According to an embodiment, various parameters of the conservative learning loss are learnt in an unsupervised manner.

B. According to an embodiment, various parameters of the conservative learning loss are learnt in a partially supervised manner.

C. According to an embodiment, the conservative learning loss is the Swapping Assignments between multiple views of the same Image (SWAV) loss.

D. According to an embodiment, the conservative learning loss differs from the SWAV loss.

E. According to an embodiment, various parameters of the conservative learning loss are constructive learning loss prototypes that are learnt in an unsupervised manner.

F. According to an embodiment, various parameters of the conservative learning loss are constructive learning loss prototypes that are learnt in a partially supervised manner. For example—different constructive learning loss prototypes sets are learnt for different classes. Thus—a set of prototypes are learnt knowing the class associated with a batch of SIUs used for learning the constructive learning loss prototypes. It has been surprisingly found that this dramatically increases the accuracy of classification.

G. An example of the various parameters are contrastive learning loss prototypes.

H. According to an embodiment, the conservative learning loss is learnt in a partially supervised manner.

According to an embodiment, another type of loss is an angular related loss that is related to a feature and at least one other parameter.

A. According to an embodiment, the angular related loss represents an angle between the feature and a ground truth center, and an added angular margin loss.

B. According to an embodiment, the angular related loss is an Arc-cosine Face Recognition (ArcFace) loss.

C. According to an embodiment, the angular related loss differs from an Arc-cosine Face Recognition (ArcFace) loss.

D. According to an embodiment, the at least one parameter is determined regardless of any parameter of the conservative learning loss.

E. According to an embodiment, the at least one parameter is determined based on one or more parameters of the conservative learning loss.

F. According to an embodiment, the at least one parameter is determined based on one or more parameters of the conservative learning loss.

G. According to an embodiment, the at least one parameter is one or more ground truth centers that are calculated based on constructive learning loss prototypes.

H. According to an embodiment, the ArcFace centers are calculated by processing (for example multiplying by a non-linear transformation) of a constructive learning loss prototype matrix.

I. According to an embodiment, the ArcFace centers are calculated by processing (for example multiplying by a non-linear transformation) of conservative learning loss prototypes.

According to an embodiment, there is provided a computer device that is configured to:

A. Obtain features generated by a neural network and representing a first augmented image and at least a second augmented image, where the first augmented image and at least the second augmented image are different augmented image versions of a training image.

B. Determine one or more an angular related losses based on the first augmented image and the second augmented image.

C. Determine a contrastive learning loss based on the first augmented image and the second augmented image.

D. Update the neural network based on the one or more angular related loss and on the contrastive learning loss.

According to an embodiment, the computer device is configured to generating, using neural network processing, the first and second neural network features.

According to an embodiment, the computer device is configured to determine the constructive learning loss by (i) determining a first code associated with the first augmented image, (ii) determining a second code associated with the second augmented image, (iii) determining a first code estimate based on the second neural network features, (iv) determining a second code estimate based on the first neural network features.

According to an embodiment, the computer device is configured to determine the constructive learning loss also by (v) determining a first fit metric based on a fit between the first code and the first code estimate, (vi) determining a second fit metric based on a fit between the second code and the second code estimate, and (v) determining the constructive learning loss based on the first fit metric and the second fit metric.

According to an embodiment, the computer device is configured to determine the constructive learning loss by mapping the first neural network features to prototypes to provide a first code, and by mapping the second neural network features to the prototypes to provide a second code.

According to an embodiment, the computer device is configured to determine the first angular related loss is based on values of the prototypes.

According to an embodiment, the computer device is configured to determine the first angular related loss based on non-linear transformation of a prototype matrix that comprises the prototypes.

According to an embodiment, the computer device is configured to determine the first additive angular loss by multiplying the first neural network features by a target centers matrix that is calculated based on the non-linear transformation of the prototype matrix.

According to an embodiment, the computer device is configured to determine the first additive angular loss by multiplying the first neural network features by a target sub-centers matrix that is calculated based on the non-linear transformation of the prototype matrix.

According to an embodiment, the determining of the constructive learning loss is based on a swapping assignment between multiple augmentations of the training image loss.

According to an embodiment, there is provided a computer device that is configured to:

A. Obtain first augmentation image features and second augmentation image features for a training image associated with a specified class.

B. Select, out of different sets of contrastive learning loss prototypes, a set of contrastive learning loss prototypes associated with the specified class; wherein the different sets of contrastive learning loss prototypes are associated with different classes.

C. Determine a contrastive learning loss on the first augmentation image features and the second augmentation image features, using the selected set of prototypes.

D. Update the neural network based on the determined contrastive learning loss.

According to an embodiment, the computer device is configured to determine one or more other losses, and to selectively amend the neural network that generated the first network features and the second neural features also based on the one or more other losses.

According to an embodiment, the one or more other losses comprise one or more angular related losses for the first augmented image and for the second augmented image.

According to an embodiment, the computer device is configured to determine the constructive learning loss in response to values of the selected set of prototypes.

According to an embodiment, the computer device is configured to determine the constructive learning loss regardless of values of the set of prototypes.

According to an embodiment, the computer device is configured to determine the constructive learning loss by (i) determining a first code associated with the first augmented image, (ii) determining a second code associated with the second augmented image, (iii) determining a first code estimate based on the second neural network features, and (iv) determining a second code estimate based on the first neural network features.

According to an embodiment, the computer device is configured to determine the constructive learning loss also by (v) determining a first fit metric based on a fit between the first code and the first code estimate, (vi) determining a second fit metric based on a fit between the second code and the second code estimate, and (v) determining the constructive learning loss based on the first fit metric and the second fit metric.

According to an embodiment, the computer device is configured to determine the constructive learning loss by mapping the first neural network features to the set of prototypes to provide a first code, and mapping the second neural network features to the set of prototypes to provide a second code.

Figure 1:
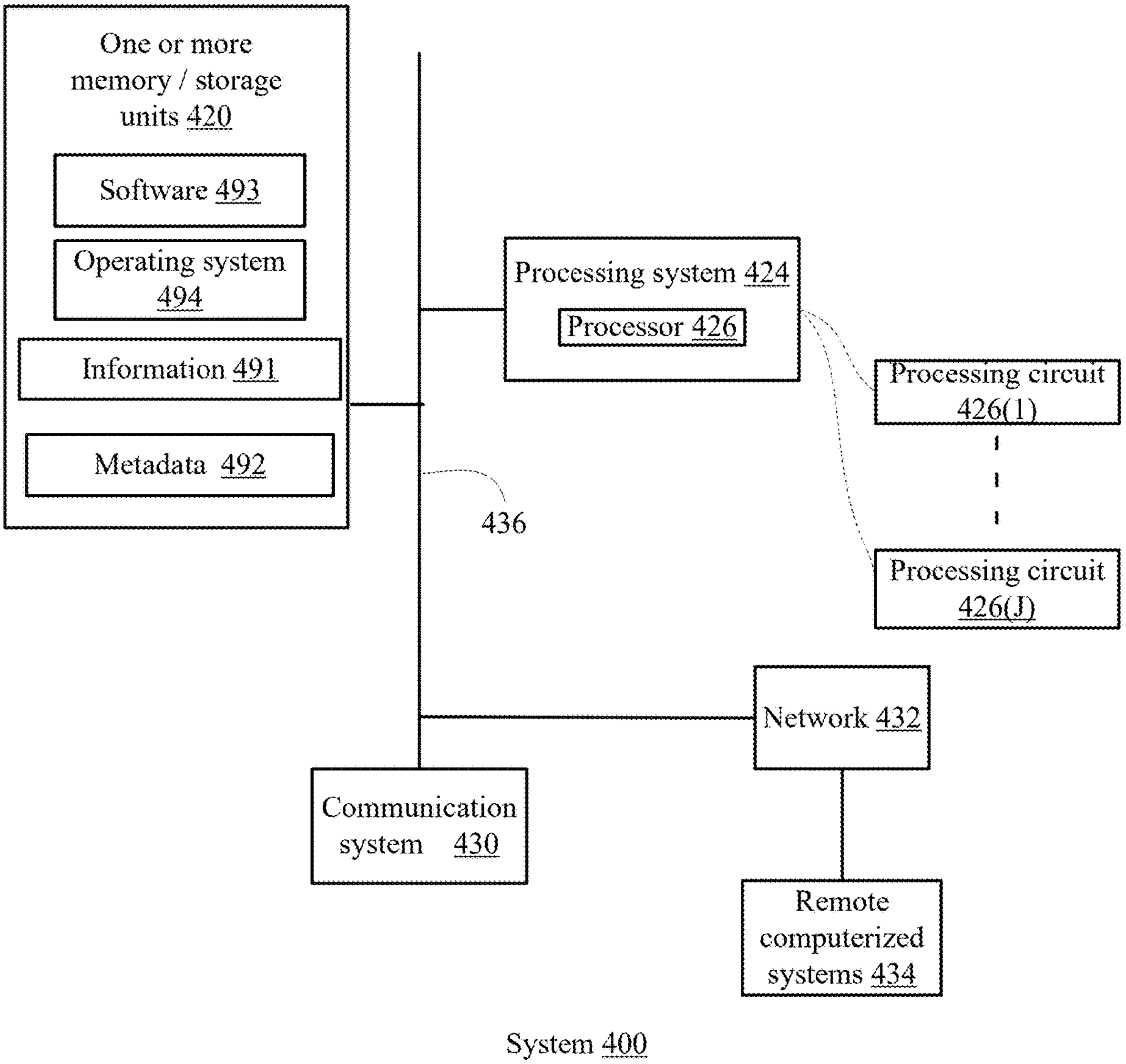
FIG. 1 illustrates an example of a computer device.

FIG. 1 is an example of the computer device 400 that includes communication system 430, one or more memory and/or storage units 420, processing system 424 including processor 426. The computerized system may be a server, a laptop, a desktop or any other computer and may include or be in communication with a sensing unit and/or a controller.

According to an embodiment, computerized system 400 is in communication with network 432 and one or more other remote computerized systems 434 that are in communication with network 432.

According to an embodiment, the communication system 430 is configured to enable communication between the one or more memory and/or storage units 420 and/or any one of the additional units and/or the network 432 (that is in communication with the remote computerized systems).

The memory and/or storage units 420 was shown as storing software. Any reference to software should be applied mutatis mutandis to code and/or firmware and/or instructions and/or commands, and the like.

Processor 426 includes a plurality of processing units 426(1)-426(J), J is an integer that exceeds one. Any reference to one unit or item should be applied mutatis mutandis to multiple units or items. For example—any reference to processor should be applied mutatis mutandis to multiple processors, any reference to communication system 430 should be applied mutatis mutandis to multiple communication systems.

According to an embodiment, the one or more memory and/or storage units 420 includes one or more memory unit, each memory unit may include one or more memory banks.

According to an embodiment, the one or more memory and/or storage units 420 includes a volatile memory and/or a non-volatile memory. The one or more memory and/or storage units 420 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database-such as any database known in the art-such as DB2®, Microsoft® Access, Microsoft® SQL Server, Oracle®, mySQL, PostgreSQL, and the like.

The memory and/or storage units 420 are configured to store firmware and/or software, one or more operating systems, data and metadata required to the execution of any of the methods mentioned in this application.

The memory and/or storage units 420 was shown as storing software. Any reference to software should be applied mutatis mutandis to code and/or firmware and/or instructions and/or commands, and the like.

Various units and/or components are in communication with each other using any communication elements and/or protocols. An example of a communication system is denoted 430. Other communication elements may be provided.

The communication system 430 may be in communication with bus 436. The bus represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 432 that is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 430) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 420 may be stored outside the vehicle. It should also be noted that the processor may evaluate signatures generated by a plurality of detectors.

According to an embodiment, the memory and/or storage units 420 stores at least one of: operating system 494, information 491, metadata 492, and software 493.

Using the software, the processing system is configured to execute one or more methods of method 500 or 600.

According to an embodiment, the one or more memory and/or storage units 420 includes one or more memory unit, each memory unit may include one or more memory banks.

According to an embodiment, the one or more memory and/or storage units 420 includes a volatile memory and/or a non-volatile memory. The one or more memory and/or storage units 420 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of the memory and/or storage units.

According to an embodiment, the at least one memory unit stores at least one database-such as any database known in the art-such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 430. Other communication elements may be provided.

SWAV. Swapping Assignments between multiple views of the same Image (SWAV) was introduced in "Unsupervised Learning of Visual Features by Contrasting Cluster Assignments", Mathilde Caron et al, arXiv:2006.09882v5 [cs.CV] 8 Jan. 2021. Unsupervised image representations have significantly reduced the gap with supervised pretraining, notably with the recent achievements of contrastive learning methods. These contrastive methods typically work online and rely on a large number of explicit pairwise feature comparisons, which is computationally challenging. SWAV takes advantage of contrastive methods without requiring to compute pairwise comparisons. Specifically, SWAV simultaneously clusters the data while enforcing consistency between cluster assignments produced for different augmentations (or "views") of the same image, instead of comparing features directly as in contrastive learning. Simply put, the "swapped" prediction mechanism is used where there is prediction of the code of a view from the representation of another view. SWAV can be trained with large and small batches and can scale to unlimited amounts of data. Compared to previous contrastive methods, SWAV is more memory efficient since it does not require a large memory bank or a special momentum network. In addition, SWAV can operate using multi-crop, that uses a mix of views with different resolutions in place of two full-resolution views, without increasing the memory or compute requirements.

Figure 2:
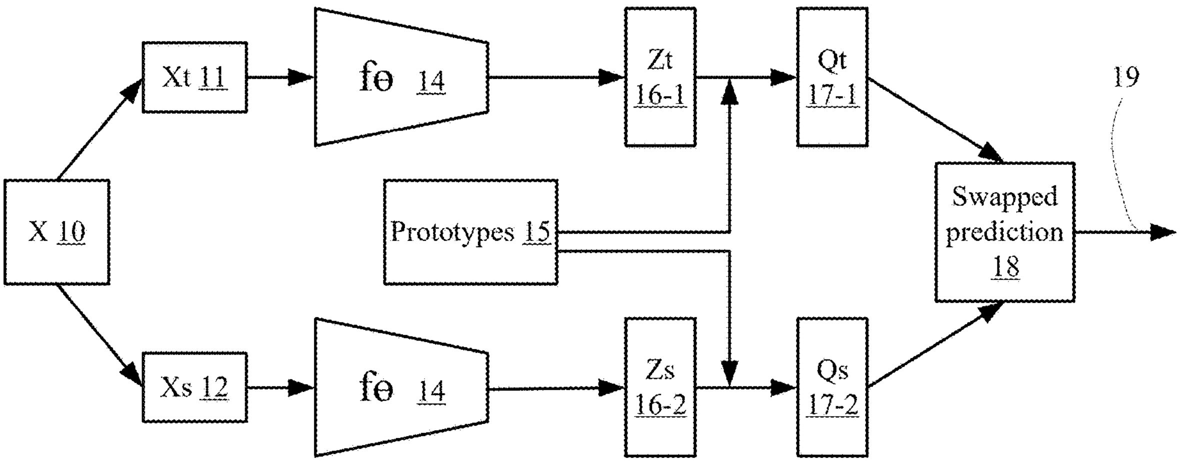
FIG. 2 illustrates an example of a Swapping Assignments between multiple views of the same Image loss calculation.

SWAV aims to learn visual features in an online fashion without supervision. To that effect, SWAV includes an online clustering-based self-supervised method. SWAV enforces consistency between codes (cluster assignments) from different augmentations of the same image. The codes are not the target of the learning, rather SWAV enforces consistent mapping between views of the same image. SWAV can be interpreted as a way of contrasting between multiple image views by comparing their cluster assignments (codes) instead of their features. More precisely, the codes are calculated from an augmented version of the image and predict this code from other augmented versions of the same image. Assuming image 10 (see FIG. 2) and given two image features zt (16-1) and zs (16-2) from two different augmentations of the same image (Xt 11 and Xs), SWAV computes their codes qt (17-1) and qs (17-2) by matching these features to a set of K prototypes {c1, . . . , cK} (denoted 15) (also referred to as clusters). SWAV then setup a "swapped" prediction problem with the following loss function: L(zt, zs)=1(zt, qs)+1(zs, qt), where the function 1(z, q) measures the fit between features z and a code q. SWAV compares the features zt and zs using the intermediate codes qt and qs. If these two features capture the same information, it should be possible to predict the code from the other feature. In SWAV each image xn is transformed into an augmented view xnt by applying a transformation t sampled from the set T of image transformations. The augmented view is mapped to a vector representation by applying a non-linear mapping fθ to xnt. The feature is then projected to the unit sphere, i.e., znt=fθ(xnt)/kfθ(xnt)k2. SWAV continues by computing a code qnt from this feature by mapping znt to a set of K trainable prototypes vectors, {c1, . . . , cK}. We denote by C the matrix whose columns are the c1, . . . , ck.

SWAV computes the codes using only the image features within a batch. Intuitively, as the prototypes C are used across different batches, SWAV clusters multiple instances to the prototypes. SWAV computes codes using the prototypes C such that all the examples in a batch are equally partitioned by the prototypes. This equipartition constraint ensures that the codes for different images in a batch are distinct, thus preventing the trivial solution where every image has the same code. SWAV calculates the prototypes in an unsupervised manner to cover all items appearing in the batch.

ArcFace. Arc-cosine Face Recognition (ArcFace) was introduced in "ArcFace: Angular related Margin Loss for Deep Face Recognition", Jiankang Deng et al., arXiv: 1801.07698v4 [cs.CV] 4 Sep. 2022.

ArcFace is a highly effective facial recognition algorithm that has gained significant attention in recent years. It addresses some of the key challenges in face recognition systems, such as handling variations in lighting, pose, expression, and identity. ArcFace employs a deep convolutional neural network (CNN) architecture, often based on popular frameworks like ResNet or MobileNet, to extract discriminative features from facial images. These features are then mapped to a hypersphere manifold, where each class (or individual identity) is represented by a unique vector.

ArcFace includes feature extraction, normalization, and calculation of an angular margin loss.

A. Feature extraction: initially, the algorithm processes input facial images through a deep CNN to extract high-level features. These features capture essential characteristics of the face while being robust to variation.

B. Normalization: before mapping features to the hypersphere, ArcFace often applies normalization techniques to enhance discriminability. One common normalization method is L2 normalization, which ensures that feature vectors have a constant Euclidean length.

C. Angular margin loss—a distinctive aspect of ArcFace lies in its loss function, specifically the Angular Margin (ArcMargin) loss. This loss function introduces an angular margin between different classes, encouraging enhanced discrimination between classes while maintaining compactness within each class. The ArcMargin loss is typically combined with the softmax function to learn both the classification and feature embedding simultaneously.

During training, ArcFace optimizes the parameters of the deep CNN and the associated margin parameters to minimize the ArcMargin loss. The training process involves iteratively feeding batches of labeled face images into the network, adjusting the parameters using backpropagation, and updating the model to improve its discriminative power.

Once trained, ArcFace model can efficiently encode facial images into feature vectors and compare them for face recognition tasks. During inference, new facial images are passed through the trained network to obtain feature embeddings. These embeddings are then compared using similarity metrics like cosine similarity or Euclidean distance to determine the identity of the individual.

Figure 3:
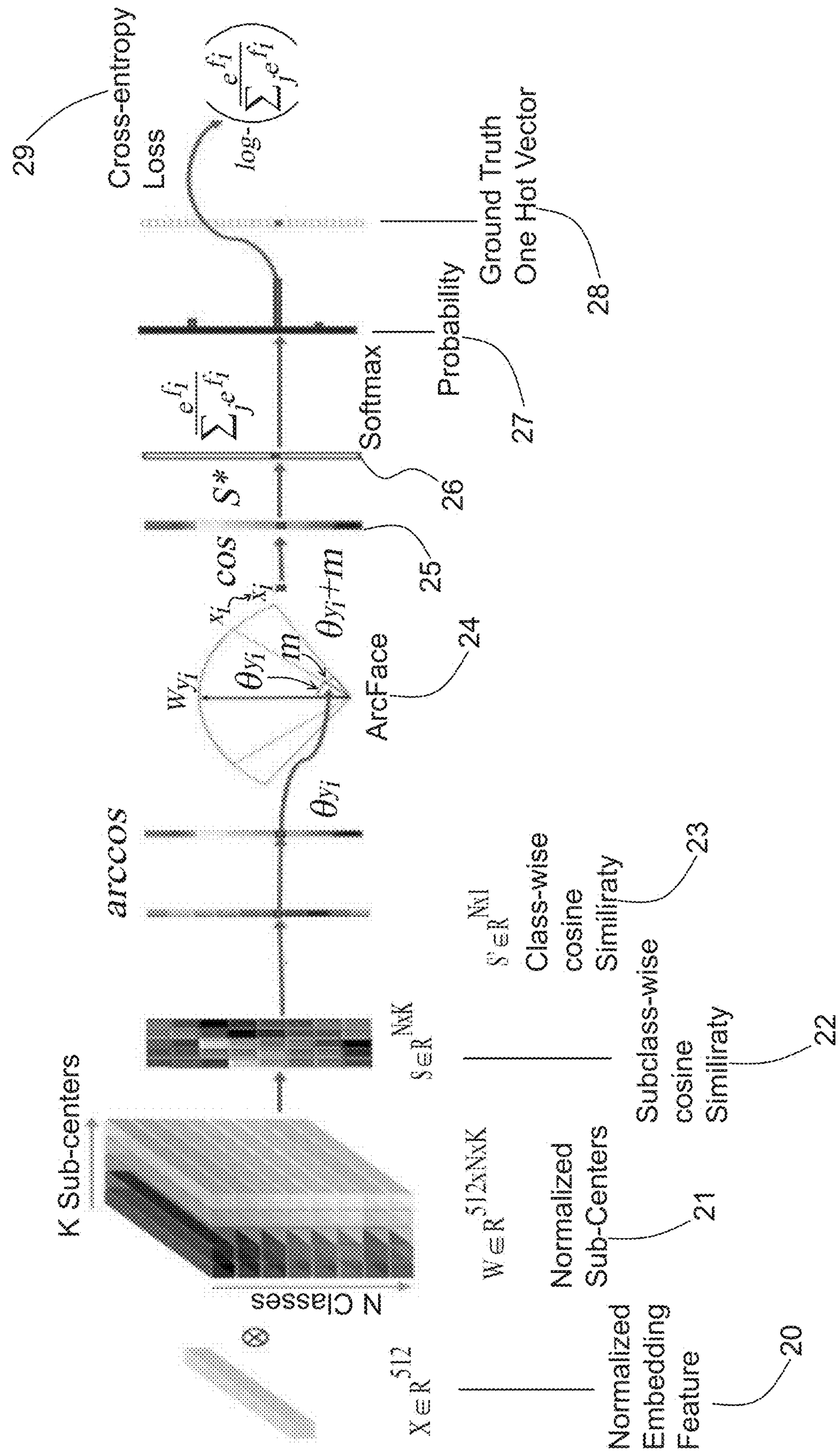
FIG. 3 illustrates an example of Arc-cosine Face Recognition (ArcFace) loss calculation.

FIG. 3 illustrates an example of the training of the ArcFace deep face recognition model by a proposed ArcFace loss and sub-center ArcFace loss. Normalized embedding feature (20) is multiplied by normalizes sub-centers to provide subclass-wise cosine similarity 22, that undergoes max pooling to provide class-wise similarity score 23. Afterwards, the angle between the feature xi and the ground truth center is calculated (denoted ArcFace 24), an angular margin penalty m is added to the target (ground truth) angle. After that, a cosine (25) of the sum of the target angle yi and m, the logits (cosine) is multiplied by feature scale s to provide product 26 that logits by the feature scale s. Finally, the logits go through a softmax function to provide a probability outcome 27, that is converted to a ground truth one hot vector 28 and a cross entropy loss 29 is calculated.

While ArcFace includes a global sample to class comparison with angular margin, another variant known as sub-center ArcFace performs a global sample to sub-center comparison with angular margin. Any reference to ArcFace should be applied mutatis mutandis to sub-center ArcFace.

Figure 4:
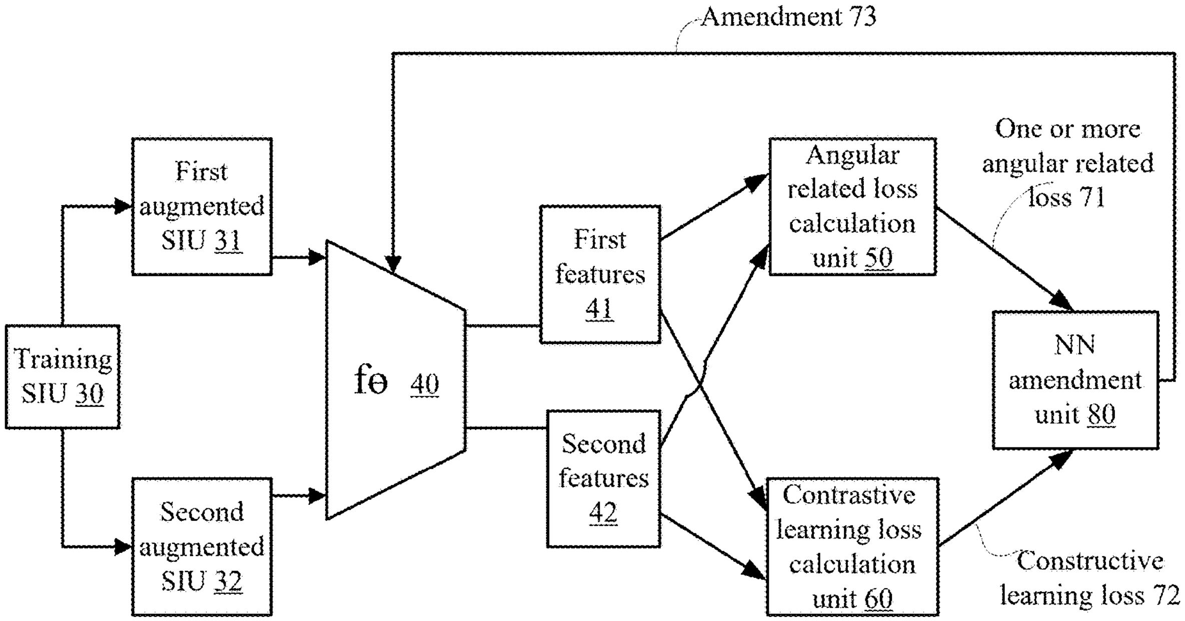
FIG. 4 illustrates an example of a training process.

FIG. 4 illustrates an example of a computerized device configured to calculate one or more angular related losses, and a contrastive related loss, and to train a neural network based on these losses.

According to an embodiment, a training SIU 20 (an SIU used for training neural network 40) is converted to a first augmented SIU and at least a second augmented SIU, where the first augmented SIU and the second augmented SIU are different augmented SIU versions of a training SIU. The first and second augmented SIUs may be generated and fed to the neural network in a serial manner or in parallel to each other.

According to an embodiment, neural network 40 receives the first and second SIUs and generates first features 41 representing the first augmented SIU and second features 42 representing the second augmented SIU.

According to an embodiment, the first features 41 and the second features 42 are fed to angular related loss calculation unit 50 that is configured to generate one or more angular related losses 71 based on the first features 41 and the second features 42. For example—a single angular related loss may be calculated based on the first and second features. Yet for another example—a first angular related loss may be calculated based on the first features and a second first angular related loss may be calculated based on the second features.

According to an embodiment, the first features 41 and the second features 42 are fed to a contrastive learning loss calculation unit 60 that is configured to generate a constructive learning loss 72.

According to an embodiment, the constructive learning loss 72 and the one or more angular related losses 71 are sent to a neural network amendment unit 80 that determines whether and how to amend the neural network 40 based on the constructive learning loss 72 and the one or more angular related losses 71.

According to an embodiment, any function can be applied on the constructive learning loss 72 and the one or more angular related losses 71 to provide one or more losses uses to amend the neural network. For example—the losses may be summed, may be weighted summed, may be multiplied to each other, any power (positive or negative) of any one of the losses may be calculated, and the like.

According to an embodiment, the neural network is amended using backward pass and weight update.

According to an embodiment, the computer device of FIG. 4 applies backpropagation or any other neural network amendment process.

Backpropagation. Backpropagation, short for "backward propagation of errors," is a fundamental algorithm used in training artificial neural networks (ANNs). It's the primary method for updating the weights of a neural network's connections to minimize the difference between the actual output and the desired output of the network.

Backpropagation includes

A. Forward pass: during the forward pass, the input data is fed into the network, and calculations are made through each layer of neurons until the output is generated. Each neuron's output is determined by applying an activation function to the weighted sum of its inputs.

B. Calculate error: Once the output is generated, the error between the predicted output and the actual output is calculated using a loss function. The loss function measures how well the network's predictions match the true labels, C. Backward pass: In the backward pass, the error is propagated backward through the network to update the weights. This is done by calculating the gradient of the loss function with respect to each weight in the network using the chain rule of calculus.

D. Weight update: After obtaining the gradients, the weights are updated in the opposite direction of the gradient to minimize the error. This update is typically performed using an optimization algorithm like gradient descent.

Steps A-D are repeated iteratively for a fixed number of iterations or until the network's performance converges to a satisfactory level.

Backpropagation allows neural networks to learn from their mistakes by adjusting the weights of connections between neurons. Through repeated iterations of forward and backward passes, the network gradually improves its ability to make accurate predictions or classifications on new, unseen data.

Other training methods. Training may be executed by methods other than backpropagation. For example:

A. Evolutionary algorithms, such as genetic algorithms or evolutionary strategies, are inspired by the process of natural selection. Instead of adjusting weights based on gradients, evolutionary algorithms evolve a population of candidate solutions over successive generations, using mechanisms like mutation, crossover, and selection.

B. Hebbian learning is a neurobiologically inspired learning rule that posits that synaptic connections between neurons strengthen when those neurons are simultaneously active. This rule is often summarized as "cells that fire together wire together".

C. Reservoir computing is a technique where the weights of a fixed recurrent neural network (the reservoir) are randomly initialized and not trained. Only the readout layer, which transforms the reservoir's dynamics into desired output, is trained using standard techniques like linear regression or ridge regression.

D. Synaptic plasticity rules, such as Spike-Timing-Dependent Plasticity (STDP), update synaptic weights based on the relative timing of pre- and postsynaptic spikes. These rules are often used in spiking neural networks, which model neural activity more closely to biological neurons.

E. Neuromodulation involves the use of neurotransmitters or other signaling molecules to modulate the plasticity of synapses in the network. Neuromodulatory mechanisms can influence learning and memory processes in artificial neural networks.

F. Feedback alignment is an alternative to backpropagation that relaxes the requirement for symmetric weight matrices in the network. Instead of directly propagating gradients backward, feedback alignment uses random feedback weights that are fixed during training, but their directionality aligns with the gradient direction.

G. Differentiable programming extends the concept of automatic differentiation, which underlies backpropagation, to a wider range of computational structures beyond neural networks. It allows for the training of models with non-standard architectures or unconventional computational elements.

Figure 5:
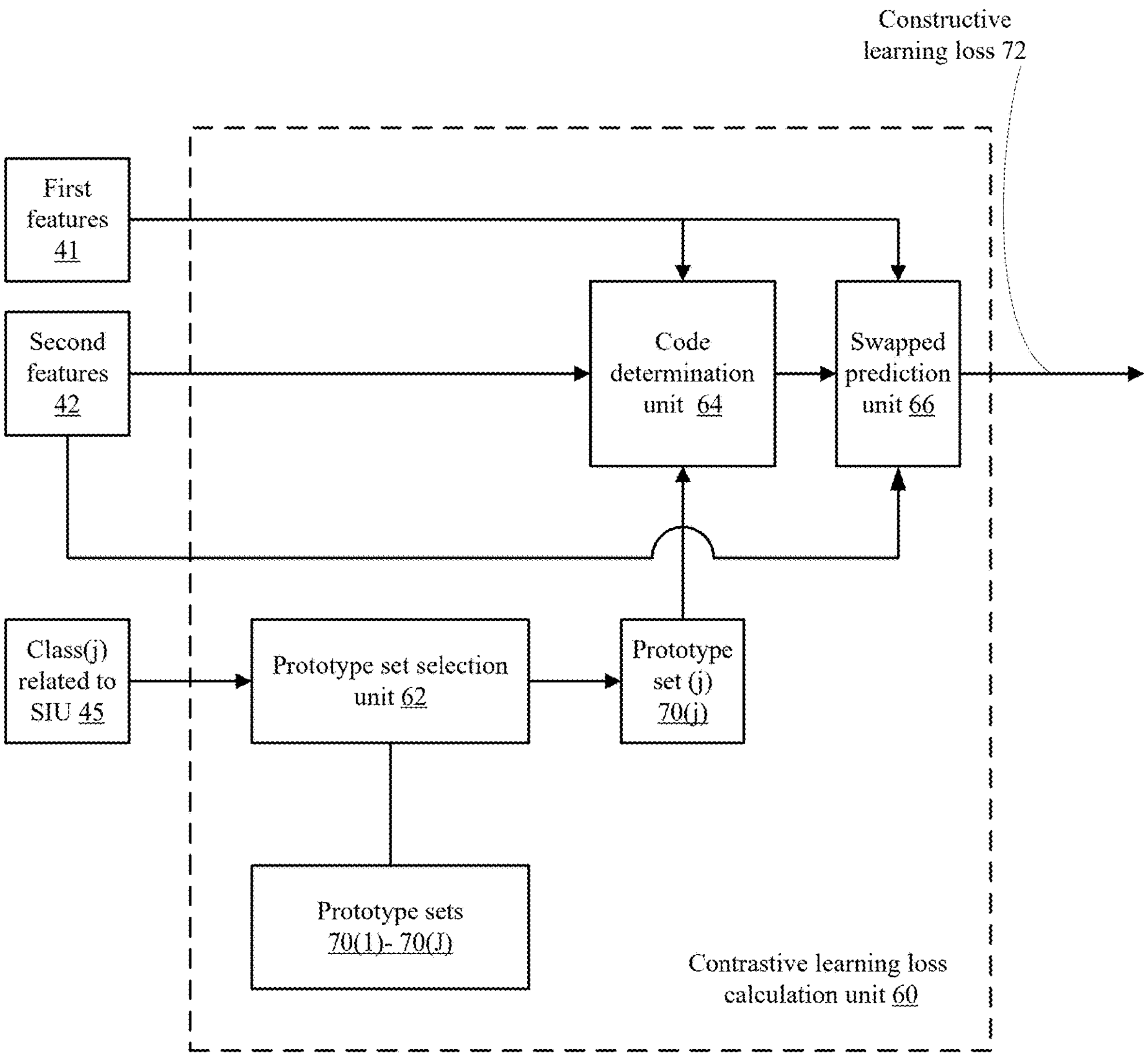
FIG. 5 illustrates an example of a contrastive learning loss calculation unit.

FIG. 5 illustrates an example of a constructive learning loss calculation unit 60.

According to an embodiment, the constructive learning loss calculation unit 60 does not apply SWAV (in which SWAV prototypes that are learnt in a purely unsupervised manner)—but learns its constructive learning loss prototypes in a partially supervised manner.

According to an embodiment-different prototypes sets are learnt for different classes. Thus—a set of prototypes is learnt knowing the class associated with a batch of SIUs used for learning the set of prototypes. It has been surprisingly found that this dramatically increases the accuracy of classification.

FIG. 5 illustrates that the constructive learning loss calculation unit 60 receives the first features 41, the second features 42 and the class (for example class (j) selected out of classes 1 to J, J being a positive integer) related to SIU 45 (the class of an element captured by the SIU), and a prototype set selection unit selects a corresponding set of constructive learning loss prototypes (prototype set (j) 70 (*j*)) to be used by the code determination unit 64 to generate a first code for the first features and a second code for the second features.

The first features, the second features, the first code and the second code are sent to the swapped prediction unit 66 that outputs constructive learning loss 72.

Figure 6:
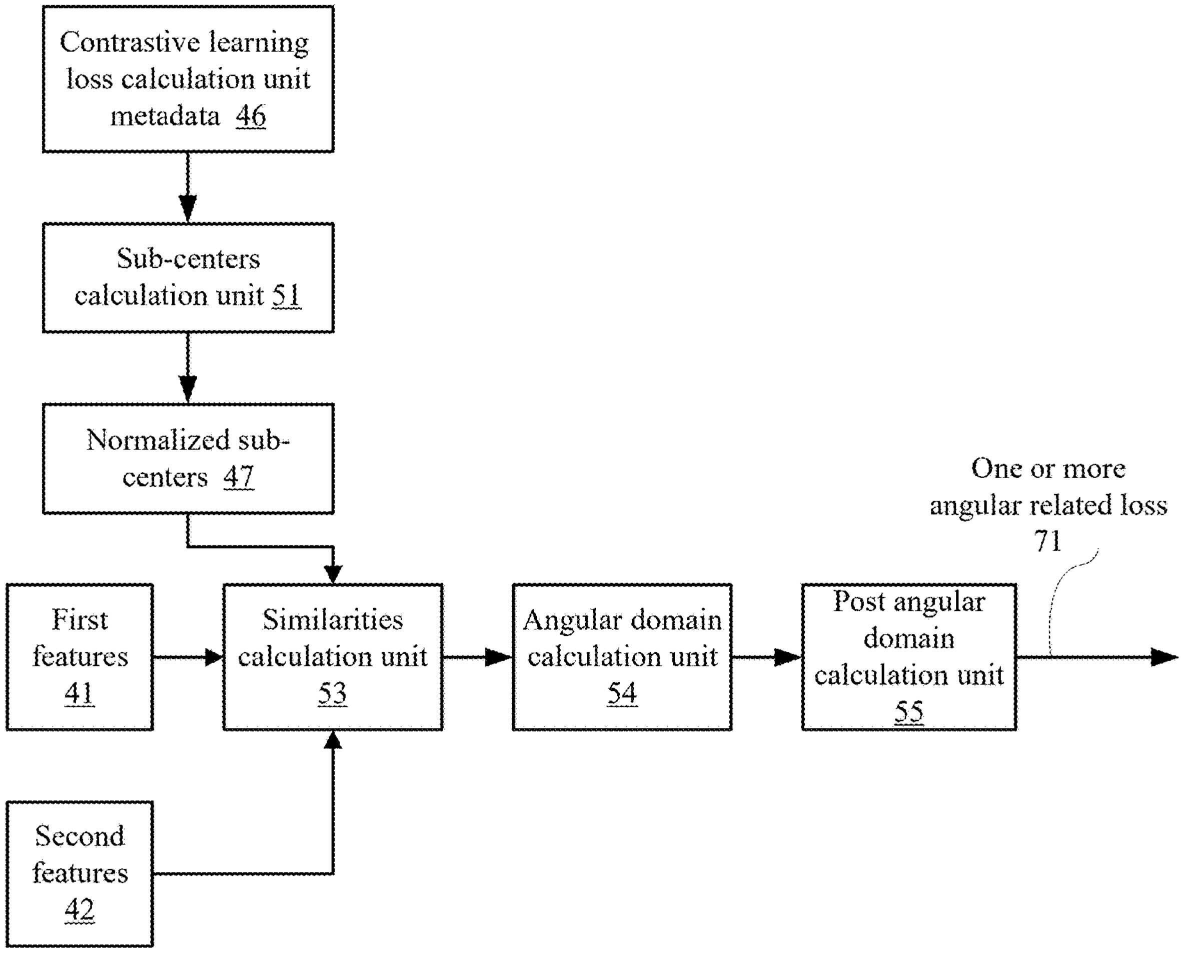
FIG. 6 illustrates an example of angular related loss calculation unit having one or more parameters determined based on constructive learning loss prototypes.

FIG. 6 illustrates an example of angular related loss calculation unit 50 having one or more parameters (such as its centers or sub-centers) determined based on constructive learning loss prototypes.

Constructive learning loss calculation unit metadata 42 such as constructive learning loss prototypes information indicative of constructive learning loss prototypes is provided to a sub-center calculation unit 51 of the angular related loss calculation unit 50—that calculates angular related loss centers or angular related loss sub-centers. According to an embodiment, the calculating includes applying a non-linear function—such as multiplying a prototype matrix by a non-linear transformation matrix. The angular related loss centers or angular related loss sub-centers may be normalized.

The angular related loss centers or angular related loss sub-centers are multiplied (by the similarities calculation unit 53) by the first features 41 and by the second features to provide one or more sub-class-wise cosine similarity information and/or one or more class-wise cosine similarity that are fed to the angular domain calculation unit 54 that calculates angular related metadata such as the additive angular error, which is fed to post angular domain calculation unit 55 that outputs one or more angular related losses 71.

FIG. 7 provides examples of a transformation of either a prototype matrix (91) or a selected set of prototypes (for example set (j)) 94 by a transformation unit (92 or 95) to provide one or more angular related loss centers (93) or angular related loss sub-centers (96).

FIG. 8 illustrates an example of method 100 for neural network training for autonomous driving.

According to an embodiment, method 100 includes an initialization step 110.

According to an embodiment, initialization step 110 includes generating, by the neural network, the first and second neural network features.

According to an embodiment, initialization step 110 includes obtaining one or more parameters of one or more types of losses determined in step 140 and/or step 150.

According to an embodiment, initialization step 110 is followed by step 120 of obtaining, by a computer device, features generated by a neural network and representing a first augmented image and at least a second augmented image, where the first augmented image and at least the second augmented image are different augmented image versions of a training image.

According to an embodiment, step 120 is followed by steps 130 and 140.

According to an embodiment, step 130 includes determining, by the computer device, one or more an angular related losses based on the first augmented image and the second augmented image.

According to an embodiment, the determining of the first angular related loss is based on values of the prototypes.

According to an embodiment, the determining of the first angular related loss is based on non-linear transformation of a prototype matrix that comprises the prototypes.

According to an embodiment, step 130 includes determining the first additive angular loss by multiplying the first neural network features by a target centers matrix that is calculated based on the non-linear transformation of the prototype matrix.

According to an embodiment, step 130 includes determining of the first additive angular loss by calculating multiplying the first neural network features by a target sub-centers matrix that is calculated based on the non-linear transformation of the prototype matrix.

According to an embodiment, step 140 includes determining a contrastive learning loss based on the first augmented image and the second augmented image.

According to an embodiment, step 140 includes (i) determining a first code associated with the first augmented image, (ii) determining a second code associated with the second augmented image, (iii) determining a first code estimate based on the second neural network features, (iv) determining a second code estimate based on the first neural network features.

According to an embodiment, step 140 further includes (v) determining a first fit metric based on a fit between the first code and the first code estimate, (vi) determining a second fit metric based on a fit between the second code and the second code estimate, and (v) determining the constructive learning loss based on the first fit metric and the second fit metric.

According to an embodiment, step 140 includes mapping the first neural network features to prototypes to provide a first code, and mapping the second neural network features to the prototypes to provide a second code.

According to an embodiment, step 140 includes determining of the constructive learning loss is based on a swapping assignment between multiple augmentations of the training image loss.

According to an embodiment, steps 130 and 140 are followed by step 150 of updating the neural network based on the one or more angular related loss and on the contrastive learning loss.

FIG. 9 illustrates an example of method 200 for neural network training.

According to an embodiment, method 200 includes step 210 of obtaining first augmentation image features and second augmentation image features for a training image associated with a specified class.

According to an embodiment, step 210 is followed by step 220 of selecting, out of different sets of contrastive learning loss prototypes, a set of contrastive learning loss prototypes associated with the specified class. Different sets of contrastive learning loss prototypes are associated with different classes.

According to an embodiment, step 220 is followed by step 230 of determining a contrastive learning loss on the first augmentation image features and the second augmentation image features, using the selected set of prototypes.

According to an embodiment, step 230 is followed by step 240 of updating the neural network based on the determined contrastive learning loss.

FIG. 10 illustrates an example of method 300 for neural network training.

According to an embodiment, method 300 includes initialization step 310.

According to an embodiment, the initialization step 310 includes obtaining one or more parameters of one or more types of losses determined in other steps of method 300.

According to an embodiment, step 310 is followed by steps 210, 220 and 230.

According to an embodiment, step 310 is also followed by step 320 of determining one or more other losses.

According to an embodiment, the one or more other losses include one or more angular related losses for the first augmented image and for the second augmented image.

According to an embodiment, step 320 is responsive to values of the selected set of prototypes.

According to an embodiment, step 320 is ignorant to values of the set of prototypes.

According to an embodiment, step 230 includes (i) determining a first code associated with the first augmented image, (ii) determining a second code associated with the second augmented image, (iii) determining a first code estimate based on the second neural network features, (iv) determining a second code estimate based on the first neural network features.

According to an embodiment, step 230 includes (v) determining a first fit metric based on a fit between the first code and the first code estimate, (vi) determining a second fit metric based on a fit between the second code and the second code estimate, and (v) determining the constructive learning loss based on the first fit metric and the second fit metric.

According to an embodiment, step 230 includes mapping the first neural network features to the set of prototypes to provide a first code, and mapping the second neural network features to the set of prototypes to provide a second code.

According to an embodiment, steps 320 and 230 are followed by step 350 of updating of the neural network that generated the first network features and the second neural features based on the constructive learning loss and the one or more other losses.

Any combination of any step of any method illustrated in the application is provided.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarding the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of transformation module, active learning module, or clustering module, or any other module described herein, may be implemented in hardware and/or code, instructions and/or commands stored in a non-transitory computer readable medium, may be included in a vehicle, outside a vehicle, in a mobile device, in a server, and the like.

The vehicle may be any type of vehicle-such as a ground transportation vehicle, an airborne vehicle, or a water vessel.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly-any reference to object detection is applicable mutatis mutandis to a pattern detection.

A situation may be a singular location/combination of properties at a point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

We claim:

1. A neural network training method for autonomous driving, the method comprising:

obtaining, by a computer device, features generated by a neural network and representing a first augmented image and at least a second augmented image, where the first augmented image and at least the second augmented image are different augmented image versions of a training image;

determining, by the computer device, one or more an angular related losses based on the first augmented image and the second augmented image;

determining a contrastive learning loss based on the first augmented image and the second augmented image;

updating the neural network based on the one or more angular related loss and on the contrastive learning loss; wherein the one or more an angular related losses comprises an Arc-cosine Face Recognition loss; and using the neural network following the training of the neural network, for classifying objects sensed by vehicle sensors for autonomous driving.

2. The method according to claim 1, comprising generating, by the neural network, the first and second neural network features.

3. The method according to claim 1, wherein the determining of the constructive learning loss comprises (i) determining a first code associated with the first augmented image, (ii) determining a second code associated with the second augmented image, (iii) determining a first code estimate based on the second neural network features, (iv) determining a second code estimate based on the first neural network features.

4. The method according to claim 3, wherein the determining of the constructive learning loss further comprises (v) determining a first fit metric based on a fit between the first code and the first code estimate, (vi) determining a second fit metric based on a fit between the second code and the second code estimate, and (v) determining the constructive learning loss based on the first fit metric and the second fit metric.

5. The method according to claim 1, wherein the determining of the constructive learning loss comprises mapping the first neural network features to prototypes to provide a first code, and mapping the second neural network features to the prototypes to provide a second code.

6. The method according to claim 5, wherein the determining of the first angular related loss is based on values of the prototypes.

7. The method according to claim 5, wherein the determining of the first angular related loss is based on non-linear transformation of a prototype matrix that comprises the prototypes.

8. The method according to claim 7, wherein the determining of the first additive angular loss comprises multiplying the first neural network features by a target centers matrix that is calculated based on the non-linear transformation of the prototype matrix.

9. The method according to claim 7, wherein the determining of the first additive angular loss comprises calculating multiplying the first neural network features by a target sub-centers matrix that is calculated based on the non-linear transformation of the prototype matrix.

10. The method according to claim 1 wherein the determining of the constructive learning loss is based on a swapping assignment between multiple augmentations of the training image loss.

11. A neural network training non-transitory computer readable medium for autonomous driving, the non-transitory computer readable medium stores instructions for:

obtaining, by a computer device, features generated by a neural network and representing a first augmented image and at least a second augmented image, where the first augmented image and at least the second augmented image are different augmented image versions of a training image;

determining, by the computer device, one or more an angular related losses based on the first augmented image and the second augmented image;

determining a contrastive learning loss based on the first augmented image and the second augmented image; wherein the one or more an angular related losses comprises an Arc-cosine Face Recognition loss;

updating the neural network based on the one or more angular related loss and on the contrastive learning loss; and using the neural network following the training of the neural network, for classifying objects sensed by vehicle sensors for autonomous driving.

12. The non-transitory computer readable medium according to claim 11, that stores instructions for generating, by the neural network, the first and second neural network features.

13. The non-transitory computer readable medium according to claim 11, wherein the determining of the constructive learning loss comprises (i) determining a first code associated with the first augmented image, (ii) determining a second code associated with the second augmented image, (iii) determining a first code estimate based on the second neural network features, (iv) determining a second code estimate based on the first neural network features.

14. The non-transitory computer readable medium according to claim 13, wherein the determining of the constructive learning loss further comprises (v) determining a first fit metric based on a fit between the first code and the first code estimate, (vi) determining a second fit metric based on a fit between the second code and the second code estimate, and (v) determining the constructive learning loss based on the first fit metric and the second fit metric.

15. The non-transitory computer readable medium according to claim 11, wherein the determining of the constructive learning loss comprises mapping the first neural network features to prototypes to provide a first code, and mapping the second neural network features to the prototypes to provide a second code.

16. The non-transitory computer readable medium according to claim 15, wherein the determining of the first angular related loss is based on values of the prototypes.

17. The non-transitory computer readable medium according to claim 15, wherein the determining of the first angular related loss is based on non-linear transformation of a prototype matrix that comprises the prototypes.

18. The non-transitory computer readable medium according to claim 17, wherein the determining of the first additive angular loss comprises multiplying the first neural network features by a target centers matrix that is calculated based on the non-linear transformation of the prototype matrix.

19. The non-transitory computer readable medium according to claim 17, wherein the determining of the first additive angular loss comprises calculating multiplying the first neural network features by a target sub-centers matrix that is calculated based on the non-linear transformation of the prototype matrix.

20. The non-transitory computer readable medium according to claim 11 wherein the determining of the constructive learning loss is based on a swapping assignment between multiple augmentations of the training image loss.

* * * * *